United States Patent [19]
Tremaine

[11] Patent Number: 6,099,165
[45] Date of Patent: Aug. 8, 2000

[54] SOFT BEARING SUPPORT

[75] Inventor: Eric Tremaine, Longueuil, Canada

[73] Assignee: Pratt & Whitney Canada Corp., Longueuil, Canada

[21] Appl. No.: 09/233,155

[22] Filed: Jan. 19, 1999

[51] Int. Cl.[7] .................................................. F16C 27/00
[52] U.S. Cl. .......................... 384/99; 384/535; 384/581; 415/142
[58] Field of Search ........................... 384/99, 535, 581; 415/138, 135, 142

[56] References Cited

U.S. PATENT DOCUMENTS

| | | | |
|---|---|---|---|
| 2,922,278 | 1/1960 | Szydlowski | 60/39.36 |
| 2,936,141 | 5/1960 | Rapata | 384/215 X |
| 3,250,512 | 5/1966 | Petrie | 415/135 |
| 3,261,587 | 7/1966 | Rowley | 415/138 |
| 3,388,880 | 6/1968 | Knight | 384/215 |
| 3,421,686 | 1/1969 | Coplin et al. | 415/229 |
| 3,952,501 | 4/1976 | Saintsbury | 60/39.23 |
| 3,979,155 | 9/1976 | Sood et al. | 384/117 |
| 4,034,560 | 7/1977 | Chute et al. | 415/142 X |
| 4,119,375 | 10/1978 | Kirk et al. | 384/104 |
| 4,245,951 | 1/1981 | Minnich | 415/139 |
| 4,304,522 | 12/1981 | Newland | 415/135 |
| 4,427,309 | 1/1984 | Blake | 384/286 |
| 4,453,783 | 6/1984 | Davis | 384/99 |
| 4,457,667 | 7/1984 | Seibert et al. | 415/174 |
| 4,782,919 | 11/1988 | Charlaire et al. | 384/99 X |
| 4,947,639 | 8/1990 | Hibner et al. | 384/99 X |
| 4,979,872 | 12/1990 | Myers et al. | 415/142 |
| 4,989,406 | 2/1991 | Vdoviak et al. | 415/209.1 X |
| 5,088,840 | 2/1992 | Radtke | 384/535 |
| 5,108,259 | 4/1992 | Wakeman et al. | 416/135 |
| 5,160,251 | 11/1992 | Ciokajlo | 415/142 |
| 5,161,940 | 11/1992 | Newland | 415/142 |
| 5,634,767 | 6/1997 | Dawson | 415/134 |
| 5,767,586 | 6/1998 | Schwanda | 384/99 X |

FOREIGN PATENT DOCUMENTS

| | | |
|---|---|---|
| 523543 | 4/1956 | Canada . |
| 601570 | 7/1960 | Canada . |
| 0761 996 A2 | 12/1992 | European Pat. Off. . |
| 975879 | 3/1951 | France . |
| 1300370 | 2/1964 | Germany . |
| 435871 | 5/1967 | Switzerland . |
| 926947 | 5/1963 | United Kingdom . |

Primary Examiner—Thomas R. Hannon
Attorney, Agent, or Firm—Jeffrey W. Astle

[57] ABSTRACT

An annular support for supporting radial bearings and accommodating radial expansion and lateral displacement, and damping vibration of the bearing with respect to a static support structure includes an annular casing to support a bearing therein and a cantilevered support which has a first and second rings, axially spaced apart and connected by a plurality of flexible beams. The first ring is connected to the annular casing which is spaced radially, inwardly from the cantilevered support and the second ring is connected to the static support structure so that the flexibility of the beams permits the annular casing to move laterally in small distance while the annular support is supported to the static support structure. The flexibility is adjusted by selection of a combination of number, width and thickness of the beams. A service line is able to have an access between two adjacent beams to the annular casing to provide lubricating fluids. The invention can be broadly applied to rotational mechanisms, in particular, to high rotational speed machine, such as aircraft turbine engines.

12 Claims, 3 Drawing Sheets

SOFT BEARING SUPPORT

TECHNICAL FIELD

The present invention relates to a bearing support structure, in particular, to an annular support for accommodating radial expansion and lateral displacement, and damping lateral vibration of a radial bearing with respect to a static support.

BACKGROUND OF THE INVENTION

It is known that radial bearings of a rotating shaft require an accurate co-centric alignment. However, the use of a precision bearing component cannot always ensure such a requirement in some applications. It is particularly true in a situation in which a rotating shaft is rotatably supported by three or more radial bearings. The alignment errors inevitably cause small radial displacement of the rotating shaft and, as a result, friction forces between the rotational components and stationary components are produced. Consequently, premature bearing failure may occur.

In consideration of dynamic requirements, the use of precision bearing components together with an effective system of a bearing lubrication is required for a rotating shaft driven at relatively high rotational speeds, such as a turbine shaft. When operating at a high rotational speed, some rotating shafts emit audible whine or noise, primarily as a result of high frequency radial shaft excursion caused by the imbalance of rotating components. In many rotary journal applications, it is not possible to alter the bearing span, or the geometry of the journal or the characteristics of the bearing to provide a resonant-free design in the bearing and its housing which is complimentary to the desired or necessary speed range of the journal. Accordingly, it is necessary to provide a bearing housing assembly which will eliminate the rotating shaft excursion and vibration to prevent premature bearing failure, expensive maintenance and repair.

Therefore, a soft bearing structure is desirable for both static and dynamic applications to accommodate lateral displacement of a bearing and damping lateral vibration of the bearing with respect to a static support structure.

Efforts have been developed in the industry to provide a soft bearing support structure. For example, U.S. Pat. No. 4,457,667 which issued to Seibert et al. on Jul. 3, 1984 is entitled "VISCOUS DAMPER WITH ROTOR CENTERING MEANS". Seibert discloses, in this patent, a method to utilize a centering spring for a viscous damped bearing of a aircraft gas turbine engine so that the bearing rotor of the shaft does not bottom against the bottom wall of the reservoir of the viscous damper during aircraft manoeuvres. The spring rate of the centering spring is optimized so as to minimize relative motion of rotor to case while maintaining the required amount of motion within the viscous damper. The centering spring comprises a group of spring rods which are assembled individually to support the viscous damper. Therefore, time and labour are extensively required to assemble this structure. Another problem is that the bearing is actually supported by both the viscous damper and the centering spring and, therefore, the flexibility or softness of the bearing is a result of the combination of the two support structures. It is difficult to precisely adjust the flexibility or softness of the bearing to meet a predetermined requirement.

As another example, in U.S. Pat. No. 3,979,155 which issued to Sood et al. on Sept. 7, 1976 and is entitled "FLEXIBLE DAMPERED BEARING SUPPORT", Sood discloses a flexible damped bearing support which comprises a moveable member for supporting the bearing within a stationary frame, a flexible spring arrangement for suspending the moveable member from the frame and centering the bearing with respect to the shaft, a uniform fluid film squeezed into the post between the frame and the moveable housing for dampering the bearing response and at least one helper spring positioned below the center line of the shaft being arranged to act upon the moveable member for supporting the dead-weight of the rotor structure. Such a construction works in a principle similar to that taught by Seibert in U.S. Pat. No. 4,457,667, except for the additional helper spring for supporting the dead-weight of the rotor structure. The bearing support disclosed by Sood also has as a problem that it is difficult to precisely calculate and adjust the flexibility or softness of the bearing support. A group of spring beams is provided rather than individual spring beams is formed integrally with the moveable member which is a part of the damper. Therefore, the moveable member has to be replaced if the spring beams are to be changed for a purpose of adjustment of the flexibility. The spring beams extend axially and are supported to the frame spaced apart from the moveable member axially rather than radially, which requires more axial space for a desired flexibility.

A further example is shown in U.S. Pat. No. 5,161,940 which issued to Newland on Nov. 10, 1992 and is entitled "ANNULAR SUPPORT". In this patent, Newland discloses an annular support which includes first and second axially spaced axial support rings connected by a plurality of elongated transfer members spaced equally about the circumference of the rings. The transfer members are configured so as to have first and second cross-sectional bending movement inertia, with the second moment of inertia being at least one order of magnitude greater than the first moment of inertia. The transfer members are oriented with the axis defining the first moment of inertia of each transferred member lying tangent to the circumference of the annular support rings. Thus the transfer beams are relatively easily flexed radially as one ring or the other moves radially, but are relatively inflexible for attempted lateral or circumferential displacement in the local circumferential plane. Due to the preferential orientation of the moment of inertia in the transfer members, the annular support disclosed in this patent prevents most relevant movement between the first and second rings while permitting uniformed differential radial expansion typically caused by differential thermal conditions. Therefore, it is apparent that the annular support is not applicable to accommodate lateral displacement and damp vibrations.

There exists a need for a soft bearing support structure to accommodate lateral displacement and to dampen lateral vibration, overcoming the shortcoming of the prior art.

SUMMARY OF THE INVENTION

An object of the present invention is to provide a bearing support structure for accommodating radial expansion and lateral displacement, and damping vibration of a bearing with respect to a static support structure.

Another object of the invention is to provide a soft bearing support structure which is able to be adjusted to dynamic requirements.

In accordance with one aspect of the invention an annular support is provided for accommodating radial expansion and lateral displacement, and damping vibration of a bearing with respect to a support structure comprising:

an annular casing adapted to radially support the bearing therein;

a cantilevered support which includes a plurality of beams extending integrally between a first ring and a second ring, the first ring being concentric with and connected to the annular casing and the second ring being axially spaced apart from and substantially co-axial relative to the first ring, the second ring being secured to the support structure; and the beams being circumferentially spaced apart, each of the beams being relatively flexible about both a first transverse bending axis oriented circumferentially with respect to a central axis of the bearing and a second transverse bending axis oriented perpendicular to the first bending axis, the annular casing being supported with respect to the support structure only by the cantilevered support so that a flexibility is provided between the annular casing and the support structure to accommodate the radial expansion and lateral displacement and for damping the vibration.

The annular casing preferably includes a cylindrical portion for receiving the bearing therein and an extension portion which extends from the cylindrical portion radially, axially and outwardly and is connected to the first ring. The first and second rings may have a similar diameter.

Preferably, the annular casing is axially between the first and second rings.

Each of the beams, preferably, is individually inflexible for attempted axial deformation so that the cantilevered support as a whole is inflexible about any transverse bending axis oriented perpendicularly with respect to the central axis. The beams may preferably be identical.

In an embodiment of the invention, the annular casing preferably comprises a annular bearing support member for receiving the bearing therein, the annular bearing member being radially and inwardly spaced apart from and co-axial with respect to the cylindrical portion. A plurality of support struts may extend axially and be connected with the cylindrical portion and the annular bearing support member. The annular bearing support member preferably includes a fluid passage for receiving lubricating fluids to lubricate the bearing. An opening is provided in the cylindrical portion adapted for receiving a service line therethrough, the service line extending radially and inwardly between two adjacent ones of the beams, and communicating with the fluid passage in the annular bearing support member for supplying lubricating fluids.

The annular support according to the invention is a simple mechanical structure to be installed between the static support structure and a bearing which may be a simple journal or an oil damped bearing. The advantageous structure provides not only a flexible support to accommodating static displacement and dynamic vibration of the bearing but also thermal expansion between the static support and the bearing. Moreover, the annular support provides an easy access for a service line to supply lubricating fluids to the bearing. The flexibility of the cantilevered support is determined by selection of a combination of the number, width and thickness of the beams therefore. The annular soft support is adjustable by changing the cantilevered support to meet the requirement of a predetermined work condition. The annular support can be broadly applied to rotational mechanisms and, in particular, to high rotational speed machines, such as aircraft turbine engines.

DETAILED DESCRIPTION OF THE PREFERRED EMBODIMENT

Figure 1:
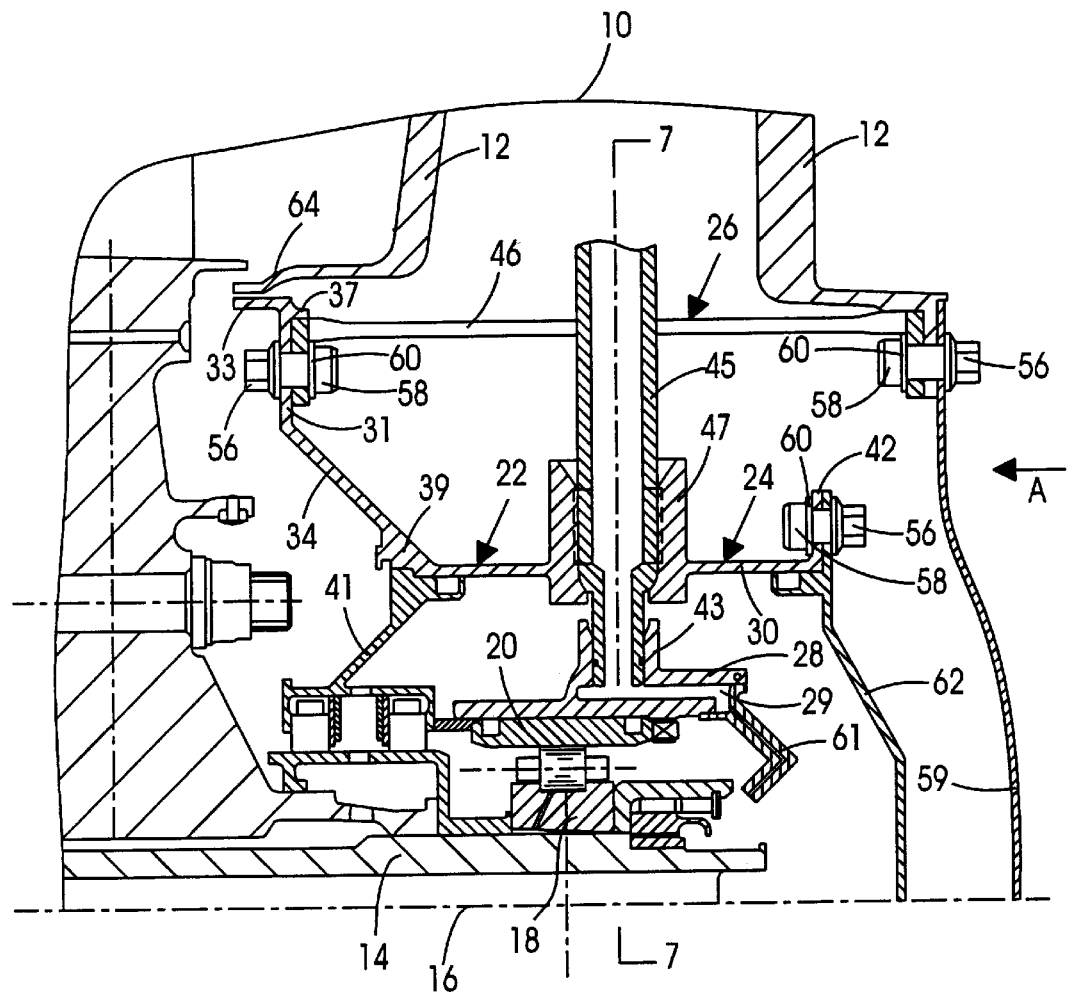
FIG. 1 is a partial and longitudinal cross-sectional view of a gas turbine engine, illustrating an annular support assembly for bearings according to the present invention.

Referring to the drawings and, in particular to FIG. 1, a portion 10 of a section of a gas turbine engine is shown in axial cross-section. The section includes an annular casing wall 12 which provides a static support structure for a rotor shaft 14. The rotor shaft 14 is concentrically disposed about the engine axis 16 and supported by bearing 18.

Bearing 18 is disposed between the shaft 14 and an annular bearing race 20 which must be supported securely within the engine in order to properly position the rotor shaft 14. The annular bearing race 20 is in turn connected to an annular support assembly 22. The annular support assembly 22 includes an annular casing 24 for radially supporting the bearing race 20 therein and a cantilevered support 26 to connect the annular casing 24 and the casing wall 12 in a cantilevered manner for accommodating radial expansion, lateral displacement, and for damping the vibrations of the bearings 18 with respect to the casing wall 12.

Figure 2:
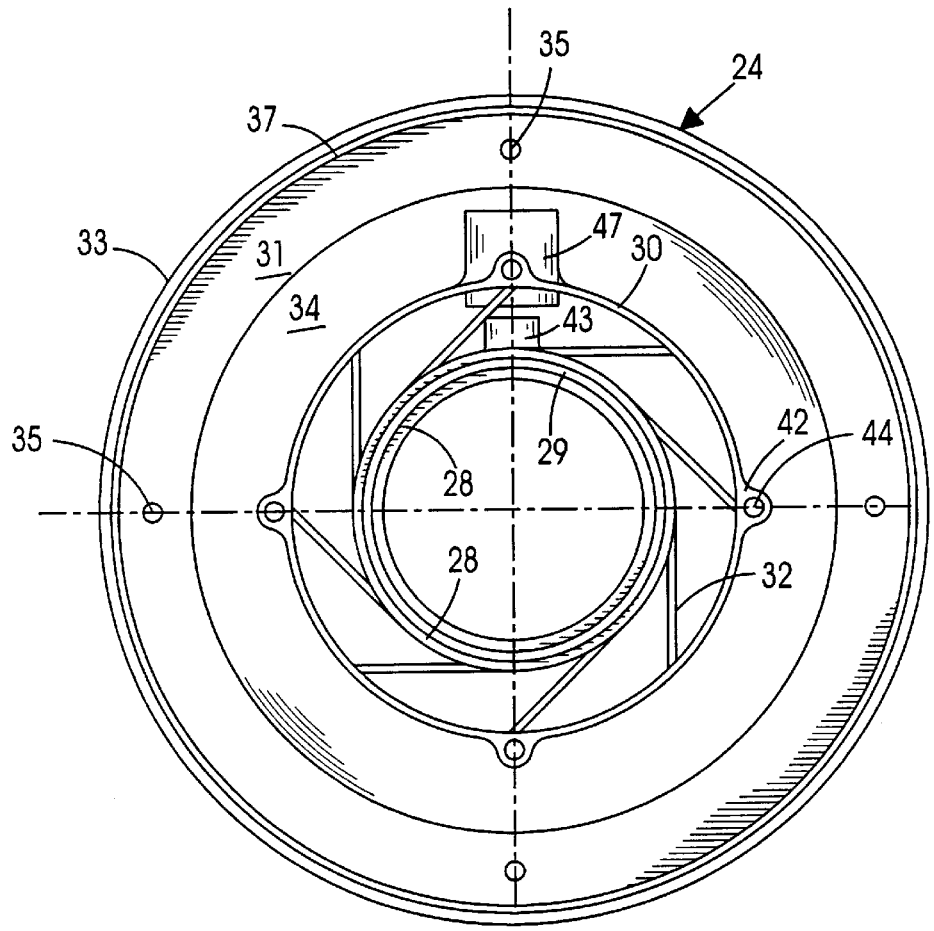
FIG. 2 illustrates an annular casing of the annular support assembly in a front view indicated by arrow A in FIG. 1, showing a plurality of tangential support struts extending between a cylindrical portion and an annular bearing support member.

FIG. 2 illustrates a front view of FIG. 1, indicated by arrow A. The annular casing 24 is shown in an unassembled state. The annular casing 24 has an annular bearing support member 28 in which the bearing race 20 is securely seated and supported as shown in FIG. 1. An annular channel 29 is formed in the bearing support member 28 as a fluid passage for receiving lubricating fluids to lubricate the bearing 18 (as shown more clearly in FIG. 7). The annular bearing support member 28 is radially and inwardly spaced from a cylindrical portion 30 of the annular casing 24 and supported therein through a plurality of tangential support struts 32. The tangential support struts 32 extend axially to connect the cylindrical portion 30 to the bearing support member 28. The annular casing 24 further includes an extension portion 34 which is seen more clearly in FIG. 1 and extends from the cylindrical portion 30 radially, axially and outwardly to be connected to the cantilevered support 26.

The edge of the extension portion 34 extends outwardly and radially and then bends, extending outwardly and axially to form a ring with a L-shaped cross-section including a radial section 31 and an axial section 33 which is shown in FIG. 1. A plurality of holes 35 are provided in the radial section 31, spaced apart circumferentially and equally for receiving connection bolts. An annular shoulder 37 protrudes from the radial section in a direction opposite to the axial section 33 for centring the cantilevered support 26 as illustrated in FIG. 1. A plurality of ears 42 with holes 44 therein are provided at the end of the cylindrical portion 30, spaced apart circumferentially and equally for receiving connection bolts.

An annular shoulder and groove structure 39 is integrally formed at the joint periphery of the cylindrical portion 30 and the extension portion 34 for accommodating a seal seating member 41, which is also illustrated in FIG. 1.

A radial inlet 43 in the annular bearing support member 28 communicates with the channel 29 for connection of a service line 45 that is used to supply lubricating fluids. A cylindrical port 47 extends radially from the cylindrical portion 30, aligned with the inlet 43 to permit the service line 45 to enter the annular casing 24 and to be connected to the inlet 43. A screw connection is provided between the service line 45 and the port 47 to secure the service line 45, as shown in FIG. 1.

Figure 7:
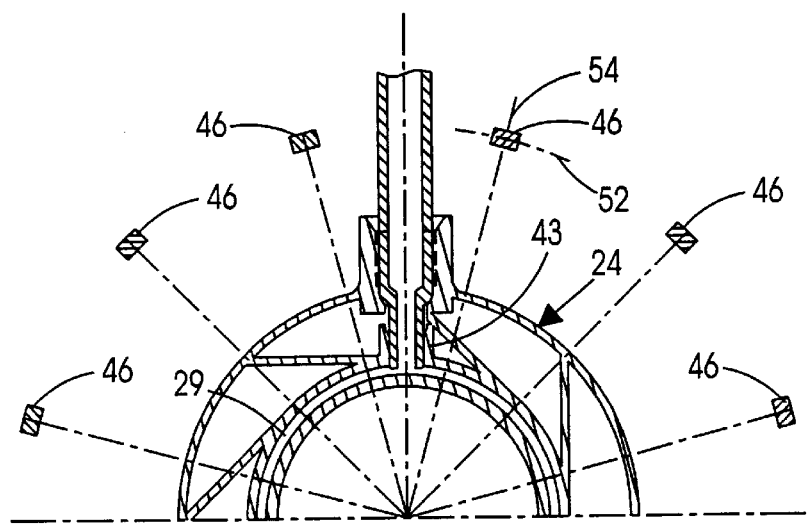
FIG. 7 is a radial cross section on the same sheet as FIG. 2 and illustrates a transverse cross-section of the annular support assembly connected with a service line, taken from line 7—7 in FIG. 1.
Figure 4:
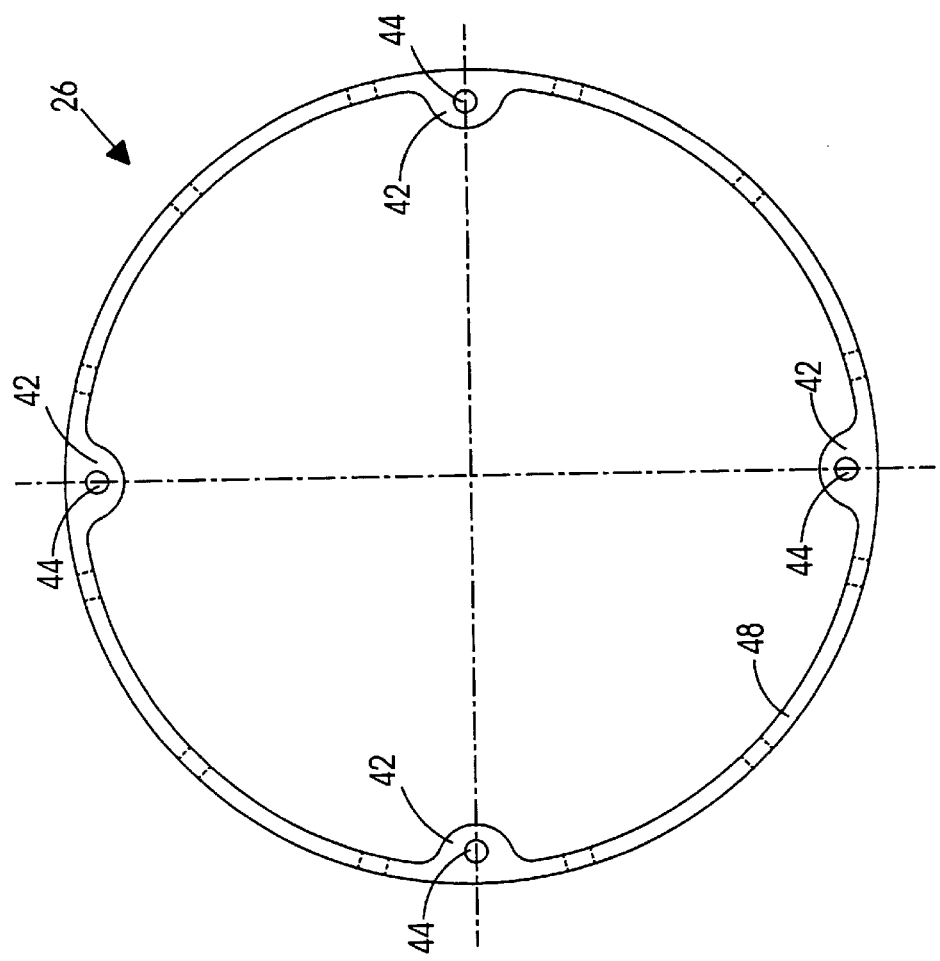
FIG. 4 is a rear view of the cantilevered support of FIG. 3.
Figure 3:
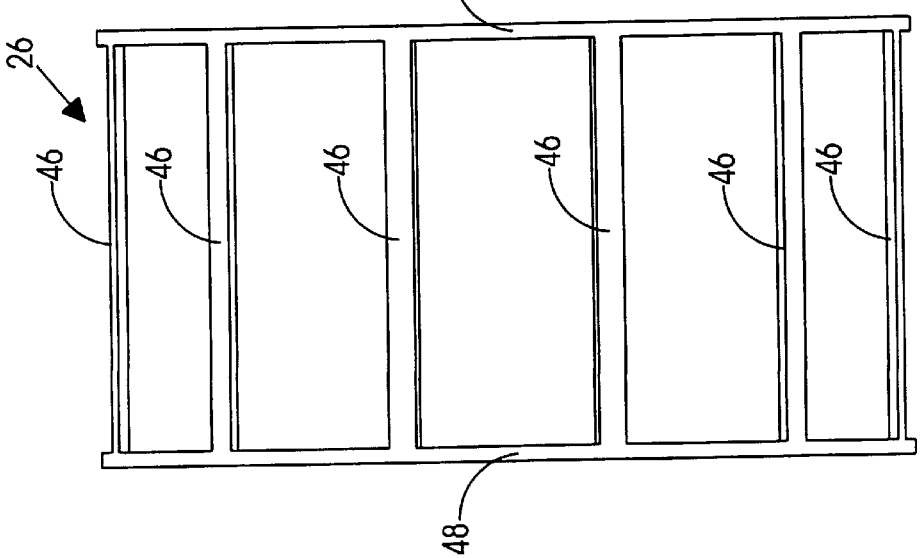
FIG. 3 is a side view of a cantilevered support of the annular support assembly of FIG. 1.

FIG. 3 and FIG. 4 show the cantilevered support in an unassembled state. The cantilevered support 26 includes a plurality of elongated beams 46 extending integrally between a first ring 48 and a second ring 50. Each of the first ring 48 and the second ring 50 has a plurality of ears 42 with the holes 44 therein, spaced apart circumferentially and equally for receiving connection bolts. The first and second rings 48 and 50 are axially spaced apart and substantially co-axial, having an equal diameter which corresponds to that of the annular shoulder 37 so that the first ring 48 is snugly fitted in the annular shoulder 37 when the cantilevered support is assembled with the annular casing 24. The beams 46 are circumferentially and equally spaced apart. Each of the beams 46 is relatively flexible about both a first transverse bending axis 52 oriented circumferentially with respect to the engine axis 16 and a second transverse bending axis 54 oriented perpendicular to the first bending axis 52, which is illustrated in FIG. 7.

It is important to notice that in contrast to the flexibility about the first transverse bending axis 52 and the second transverse bending axis 54, each of the beams 46 is individually inflexible for attempted axial deformation to ensure that the cantilevered support 26, as a whole, is inflexible about any transverse bending axis oriented perpendicularly with respect to the central axis. The issue is discussed in more detail below.

Figure 5:
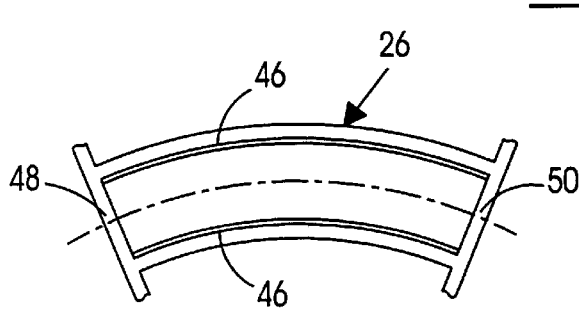
FIG. 5 on the same sheet as FIG. 1, is a partial side view illustrating the cantilevered support which is in a bending state when each beam is individually flexible for axial deformation.
Figure 6:
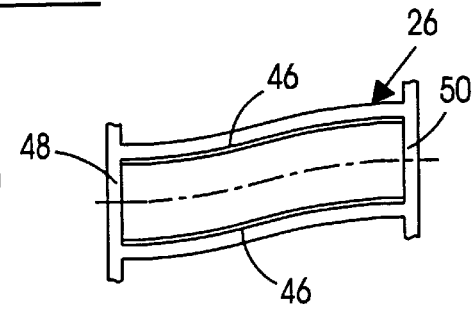
FIG. 6 on the same sheet as FIG. 1, is a partial side view illustrating the cantilevered support which is in a lateral deformation when each beam is individually inflexible for attempted axial deformation.

It is well known by a person skilled in the art that if an elongated element is bent, the material in the outer side of the element will be pulled longer and the material in the inner side is pressed shorter. FIG. 5 in a schematic side view, illustrates the cantilevered support 26 which is bent if each of the beams 46 is individually flexible for axial deformation. In this circumstance, the beams 46 above the central axis are pulled longer while the beams 46 below the central line are pressed shorter, the first and the second ring 48, 50 not being kept parallel to each other. Nevertheless, if each of the beams 46 is individually inflexible for attempted axial deformation, the cantilevered support 26 as a whole, under a lateral force, is deformed laterally as illustrated in FIG. 6. The lateral deformation illustrated in FIG. 6 is a shearing deformation in which the first and second rings 48, 50 are kept parallel to each other.

As illustrated in FIG. 1, the annular casing 24 and the cantilevered support 26 are assembled together to form the annular support 22 using a plurality of bolts 56, nuts 58 and washers 60 to connect the first ring 48 of the cantilevered support 26 and the radial section 31 of the extension portion 34 through the holes 35, 44, respectively. The annular support assembly 22 is disposed between the bearings 18 and the annular casing wall 12 to radially support the bearings 18 and the rotor shaft 14, being secured to the annular casing wall 12 by a plurality of bolts 56, nuts 58 and washers 60 which individually connect the second ring 50 of the cantilevered support 26 through the holes 44 therein and the annular casing wall 12 through the corresponding holes therein.

A cover plate 59 is provided to close the open end of the annular casing wall 12. An outlet 61 is secured to the annular bearing support member 28 and communicates with the annular channel 29 to deliver the lubricating fluids to the rotor shaft 14. An end lid 62 is secured to the annular casing 24 by a plurality of bolts 56, nuts 58 and washers 60 through the holes 44 at the end of the annular casing 24 and the corresponding holes in the end lid 62 to seal the lubricating fluids within the annular casing 24. The annular seal seating member 41 that containing seals around the rotor shaft 14 is sealingly accommodated by the shoulder and groove structure 39 to prevent fluids leakage at the other end of the annular casing 24.

Because of the flexibility of the beams 46, the annular casing 24 with the bearings 18 and rotor shaft 14 that is supported by the first ring 48 is capable of moving laterally with respect to the engine axis 16 a small distance while the second ring 50 is statically supported by the annular casing wall 12. When the lateral displacement of the annular casing 24 occurs, caused from a static force or dynamic imbalance, the cantilevered support 26 is deformed in the manner as illustrated in FIG. 6, rather than that in FIG. 5. Therefore, potential angular deformation of the annular casing 24 or the bearings 18 and rotor shaft 14 and stresses caused therefrom are avoided. In a dynamic instance, the cantilevered support 26 with a predetermined flexibility is capable of consuming vibration energy and damping the vibration. In a static instance, the cantilevered support 26 with a predetermined flexibility accommodates the displacement of the bearings 18 relative to the static annular casing wall 12 to relieve stresses and friction of the bearings 18 which causes premature bearing failure or may snub off the rotation of the rotor shaft 14. The flexibility of the cantilevered support 26 is adjusted by selection of an appropriate combination of the number, width and thickness of the beams 46. The changing of the cantilevered support 26 enables the soft bearing support to be adjusted to meet static or dynamic requirements.

An annular stop ring 64 is integrally formed with the annular casing wall 12 as shown in FIG. 1 to limit the lateral displacement of the annular casing 24.

Furthermore, the flexibility of the beams 46 permits the second ring 50 to expand or contract radially together with the local section of the annular casing wall 12 which is affected by local temperature variation while the annular casing 24 is not affected.

Changes and modifications to the above-described embodiment will no doubt be apparent to those skilled in the art.

The scope of the invention is therefore intended to be limited solely by the scope of the appended claims.

We claim:

1. An annular support for accommodating radial expansion and lateral displacement and damping vibration of a bearing with respect to a support structure comprising:

an annular casing adapted to support the bearing therein;

a cantilevered support which includes a plurality of beams extending integrally between a first ring and a second ring, the first ring being concentric with and connected to the annular casing and the second ring being axially spaced apart from and substantially co-axial relative to the first ring, the second ring being adapted to be secured to the support structure; and the beams being circumferentially spaced apart, each of the beams being relatively flexible about both a first transverse bending axis oriented circumferentially with respect to a central axis of the bearing and a second transverse bending axis oriented perpendicular to the first bending axis, the annular casing being supported with respect to the support structure only by the cantilevered support so that a flexibility is provided between the annular casing and the support structure to accommodate the radial expansion and lateral displacement and dampen the vibration.

2. A support as claimed in claim 1 wherein the annular casing includes a cylindrical portion for receiving the bearing therein and an extension portion which extends from the cylindrical portion radially, axially and outwardly and is connected to the first ring.

3. A support as claimed in claim 2 wherein the annular casing comprises a annular bearing support member for receiving the bearing therein, the annular bearing member being radially and inwardly spaced apart from and co-axial with respect to the cylindrical portion.

4. A support as claimed in claim 3 wherein the annular casing further comprises a plurality of support struts extending axially and connected with the cylindrical portion and the annular bearing support member.

5. A support as claimed in claim 4 wherein the annular bearing support member includes a fluid passage for receiving lubricating fluids to lubricate the bearing.

6. A support as claimed in claim 5 wherein an opening is provided in the cylindrical portion adapted for receiving a service line therethrough, the service line extending radially and inwardly between two adjacent ones of the beams and communicating with the fluid passage in the annular bearing support member for supplying lubricating fluids.

7. A support as claimed in claim 6 wherein the annular bearing support member further comprises an inlet communicating with the fluid passage, adapted for connection to the service line.

8. A support as claimed in claim 6 wherein the opening is defined by a cylindrical port extending radially from the cylinder portion.

9. A support as claimed in claim 2 wherein the annular casing is axially between the first and second rings.

10. A support as claimed in claim 1 wherein the first and second rings have a similar diameter.

11. A support as claimed in claim 1 wherein each of the beams is individually inflexible for attempted axial deformation so that the cantilevered support as a whole is inflexible about any transverse bending axis oriented perpendicularly with respect to the central axis.

12. A support as claimed in claim 1 wherein the beams are identical.

* * * * *